Aug. 27, 1968
C. SCHMITZ ET AL
3,398,529
ARRANGEMENT OF NOZZLE BODIES OF HOOKLIKE FUEL INJECTION
NOZZLES AT THE COMBUSTION CHAMBER OF
GAS-TURBINE DRIVE UNITS
Filed Sept. 6, 1966
2 Sheets-Sheet 1
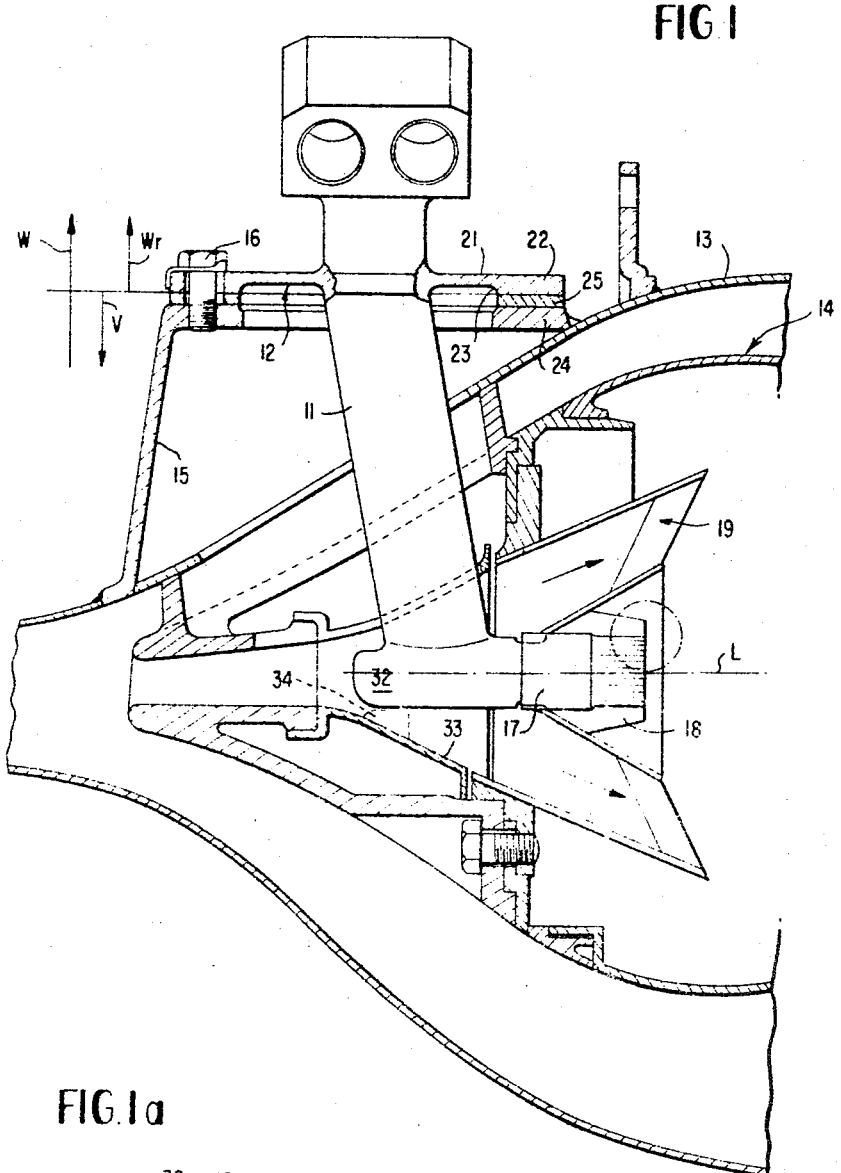
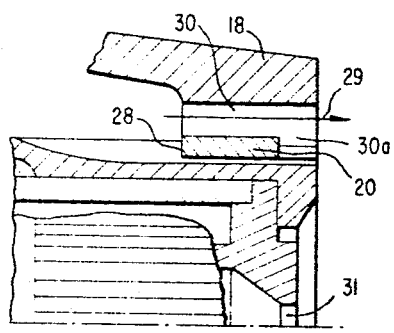
INVENTORS
CHRISTIAN SCHMITZ
WERNER A. BRUDER
BY Dicke + Craig
ATTORNEYS

United States Patent Office 3,398,529
Patented Aug. 27, 1968

3,398,529
ARRANGEMENT OF NOZZLE BODIES OF HOOK-LIKE FUEL INJECTION NOZZLES AT THE COMBUSTION CHAMBER OF GAS-TURBINE DRIVE UNITS
Christian Schmitz, Post Schorndorf, Engelberg, and Werner A. Bruder, Neckarrems, Germany, assignors to Daimler-Benz Aktiengesellschaft, Stuttgart-Unterturkheim, Germany
Filed Sept. 6, 1966, Ser. No. 577,515
Claims priority, application Germany, Sept. 16, 1965, D 48,217
22 Claims. (Cl. 60—39.72)

ABSTRACT OF THE DISCLOSURE

An arrangement of the nozzle body of hook-shaped fuel injection nozzles at the combustion chamber of gas-turbine drive units by means of a securing flange provided at the nozzle body which is detachably connected with the combustion chamber outer wall whereby the nozzle mouthpiece is inserted into the flame holder. The securing flange is constructed of thin wall spring steel to resiliently absorb the thermal expansion differences between the nozzle body and the combustion chamber system so that the nozzle mouth piece may be radially and axially fixed to the flame holder without adversely affecting the flame by thermal distortions.

Background of the invention

It is known in gas turbine drive units to provide at the part of the injection nozzle body projecting out of the combustion chamber a securing flange and to detachably connect the same with the combustion chamber outer wall by means of bolts or screws. The forward end of the nozzle body coordinated to the flame holder, i.e., the nozzle mouthpiece is thereby fixed in the radial direction within a hub, at the outer circumference of which are provided blades or vanes for producing a rotary or swirling flow of the centrally entering portion of the primary air. With these known arrangements, special difficulties arise in connection with the control of the heat stresses and expansion differences occurring during the operation between nozzle body and the combustion chamber walls as well as between the flame holder or the centering hub and the nozzle mouthpiece so that these structural parts are exposed to a considerable load and stress. In order to absorb this expansion difference, one dispenses with a secure and fixed fastening of the nozzle mouthpiece in the axial direction within the hub of the flame holder which, however, entails the disadvantage that the injection nozzle orifice or mouth changes at different operating temperatures, i.e., in different output ranges, its position with respect to the flame holder so that the combustion process does not take place in an optimum manner over the entire load range. With the installation of so-called hook-like nozzles there also arises the disadvantage that with an increasing operating temperature or with an ever increasing thermal expansion, the annular air gap radially disposed about the nozzle mouthpiece or the star-shaped air-passage apertures provided in the hub-shaped nozzle holder change as a result of eccentric offsets or displacements of the nozzle mouthpiece whereby disturbances occur in the combustion process such as coking at the nozzle orifice, local overheating, difficulties in starting, possibly extinguishing of the flame and other appearances. Furthermore, there exists the danger of crack formation at the combustion chamber outer wall and the securing flange of the nozzle body by reason of the large thermal stresses.

Summary of the invention

The present invention is based on the aim to avoid the disadvantages of the known arrangements of injection nozzle bodies and the dangers connected therewith.

As solution to the underlying problem, it is proposed according to the present invention to constitute the securing flange of the nozzle body for the purpose of elastic absorption of the expansion differences between the combustion chamber system and the nozzle body, as an expanding body yielding essentially in the axial direction with respect to the flange plane.

According to the construction of the present invention, the securing flange is provided with a relatively thin-walled expansion collar which passes over by way of a rounded portion with a relatively large radius of curvature into a reinforced flange foot.

In order to constitute the expanding collar of the securing flange particularly suitable for axial expansions and to construct the same so as to be angularly movable also within small limits, it may be constructed curved or half-wave shaped.

In order to keep away from the centering hub of the flame holder and from the nozzle body itself the loads and stresses acting on the securing flange, the rear end of the portion of the hook-shaped nozzle body extending in the longitudinal axis of the nozzle mouth or orifice is further supported according to the present invention by protuberances which are effective perpendicularly to this axis, are disposed in the plane of the nozzle body and are arranged at the inner air guidance. These protuberances absorb therefore the reaction forces occurring perpendicularly to the securing flange plane so that the centering of the nozzle mouthpiece is relieved whereas the expansion differences between the nozzle body and the combustion chamber outer wall are absorbed only by the securing flange and are allowed to die out therein. These support protuberances, however, form no impairment in the direction of the longitudinal axis of the nozzle orifice.

A further aim of the present invention resides in so realizing the arrangement of the nozzle body and its securing that the thermal expansions and stresses during the operation are compensated or at least reduced in order to avoid maximum stresses beforehand.

In order to achieve this, it is further proposed in accordance with the present invention to make the arrangement in such a manner that with a cold drive unit or with a cold combustion chamber the securing flange has a prestress opposite the thermal stress during the operation. It is appropriate to select the prestress in such a manner that it amounts to half the maximum thermal stress so that the absolute maximum stress of the structural parts installed within the area of the arrangement amounts to only one-half the maximum operating stress, and during the mean load of the drive unit the absolute stress is at the value of about zero or only slightly thereabove.

In order to achieve the prestress for the securing flange without considerable special measures, a spacer disk with a corresponding height (thickness) may be inserted between the bottom side of the flange foot and the seat thereof on the combustion chamber outer wall.

A further feature of the present invention resides in constructing the securing flange as a separate structural part and to connect the same detachably with the nozzle body. This measure entails the advantage that both for the nozzle body as well as for the securing flange, the most suitable materials may be selected, such as, for instance, spring steel for the latter structural part.

Accordingly, it is an object of the present invention to provide a mounting arrangement for the nozzle body of hook-shaped fuel injection nozzles at the combustion chamber of gas-turbine drive units which is simple in construction and effectively avoids the shortcomings and drawbacks encountered in the prior art constructions.

Another object of the present invention resides in a mounting and securing arrangement for the nozzle body of fuel injection nozzles at the combustion chamber walls which permits ready control of the thermal stresses and differences in expansion occurring in the various parts while at the same time protecting these parts against excessive stresses.

A further object of the present invention resides in an arrangement for the nozzle body of fuel injection nozzles at the fixed parts of a gas turbine which permits maintenance of optimum combustion conditions over the entire load range while avoiding disturbances during operation of the turbine.

A further object of the present invention resides in a mounting arrangement for the nozzle body of fuel injection nozzles at a fixed part of a gas-turbine which effectively prevents coking of the nozzle orifice, local overheating, as well as extinction of the flame or difficulties during starting.

Another object of the present invention resides in a securing arrangement for the nozzle body of injection nozzles at a relatively fixed part of the gas turbine which effectively precludes the danger of crack formation.

A still further object of the present invention resides in a mounting arrangement for the nozzle body of fuel injection nozzles in gas-turbine units which utilizes a prestress of such magnitude and nature as to counteract the thermal stresses that occur during operation and therewith minimizes the maximum possible stresses that may occur.

Still a further object of the present invention resides in an arrangement of the nozzle body of fuel injection nozzles at the combustion chamber walls of gas turbine drive units which is so constructed and arranged as to permit appropriate selection of the most suitable materials for the various parts.

*Brief description of the drawing*

These and further objects, features and advantages of the present invention will become more obvious from the following description when taken in connection with the accompanying drawing which shows, for purposes of illustration only, several embodiments in accordance with the present invention, and wherein:

FIGURE 1 is an axial cross-sectional view through the forward part of a combustion chamber with the arrangement of the injection nozzle body according to the present invention.

FIGURE 1a is a partial cross-sectional view, on an enlarged scale, indicating the details of the encircled portion of FIGURE 1.

*Detailed description of the drawing*

Figure 2:
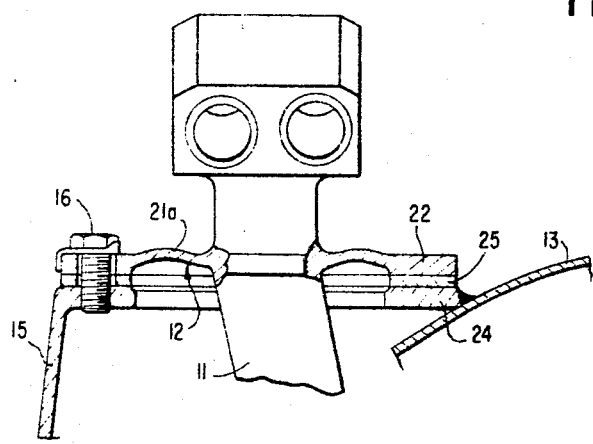
FIGURE 2 is a partial cross-sectional view, similar to FIGURE 1, and illustrating a modified embodiment of a securing flange in accordance with the present invention.

Referring now to the drawing wherein like reference numerals are used throughout the various views to designate like parts, the hook-shaped injection nozzle body generally designated by reference numeral 11 is provided according to FIGURE 1 with a securing flange generally designated by reference numeral 12, by means of which it is detachably secured on the outer wall 13 of the combustion chamber generally designated by reference numeral 14 or on a bearing support provided at the outer wall 13 by means of screws or bolts 16. The nozzle mouthpiece 17 is seated within a hub 18 of the flame holder generally designated by reference numeral 19 and is fixed thereat in the radial as well as in the axial direction by a spacer ring 20. The rear end surface of the spacer ring 20 is supported at a shoulder or offset 28 disposed along the circumference of the nozzle mouthpiece 17. The hub portion 18 of the flame holder 19 is constructed along its inner circumference in a star-shaped manner whereby the combustion atomizing air 29 (FIGURE 1a) flows through the existing star gaps or apertures. The star prongs 30 form a radial collar 30a which represents an axial abutment for the forward end face of the spacer ring 20. The position of the nozzle orifice or mouth 31 with respect to the flame holder 19 is determined by the length of the spacer ring 20. The securing flange 12 consists of a relatively thin-walled expansion collar 21 and of a reinforced flange foot 22. The transition between the expansion collar 21 and the flange foot 22 takes place by way of a rounded-off portion 23 with relatively large radius of curvature in accordance with considerations of rigidity.

The arrangement of the nozzle body 11 takes place with a cold drive unit or cold combustion chamber in such a manner that a prestress V is produced in the securing flange 12 or in the expansion collar 21 which amounts to about one-half the maximum thermal expansion or the thermal stress W during operation of the drive unit. With increasing warm-up of the combustion chamber, the latter and more particularly the outer wall 13 thereof expands more strongly than the injection nozzle body 11 which is continuously cooled by the fuel flowing therethrough so that as a result of the oppositely directed thermal stress W (maximum occurring thermal stress) the prestress force V is eliminated and an effective residual thermal stress Wr remains which in every case is smaller than the maximum thermal stress W. The magnitude of the prestress V can be determined by a spacer disk 25 inserted between the flange foot 22 and the seat 24. This spacer disk 25 also serves for compensating manufacturing inaccuracies. In order to keep away from the hub 18 of the flame holder 19 and from the nozzle body 11 the loads and stresses acting on the securing flange 12, the rear end 32 of the part of the hook-shaped nozzle body 11 extending in the longitudinal axis L of the nozzle orifice 31 is supported by protuberances 34 effective perpendicularly to this axis L, disposed in the nozzle body plane, i.e., in the plane of the drawing and accommodated at the air guide means 33. The protuberances 34 therefore absorb the reaction forces occurring perpendicularly to the plane of the securing flange 12 so that the centering of the nozzle mouthpiece 17 is completely relieved whereas the expansion differences between the nozzle body 11 and the combustion chamber outer wall 13 are absorbed only by the securing flange 12 and are caused to fade out therein. These support protuberances 34, however, form no impairment in the direction of the longitudinal axis L of the nozzle orifice 31.

As may be seen from FIGURE 2, the expansion collar 21a of the securing flange 12 is constructed curved or of half-wave shape. As a result of this configuration, the expansion collar 21a is well suited to elastically deform under the influence of thermal stresses and expansions, and more particularly primarily in the axial direction to the flange plane, but also within slight limits angularly movably.

Figure 3:
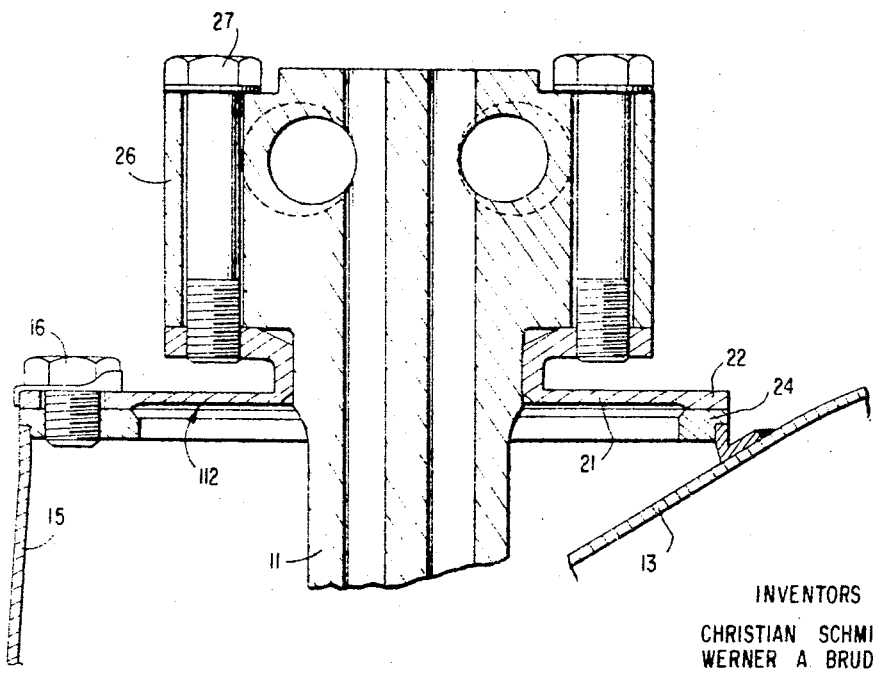
FIGURE 3 is a partial cross-sectional view, similar to FIGURE 2, and illustrating a still further modified embodiment of a securing flange in accordance with the present invention which represents a separate structural part detachably connected with the nozzle body.

According to FIGURE 3, the securing flange 12 is constructed as separate structural part and is detachably connected with the head 26 of the nozzle body 11 by screws or bolts 27. The securing flange 12 may thereby be made of spring steel so that it can do justice in a particular satisfactory manner to its intended purpose.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. An arrangement for mounting fuel injection nozzles on the outer wall of the combustion chamber system of gas-turbine drive units, comprising an elongated nozzle body means extending into the combustion chamber from said wall and having securing flange means generally at one end, flame holder means mounted to said combustion chamber system separate from said nozzle body means, a nozzle mouthpiece extending at an angle from the other end of said body means and being inserted into said flame holder means, means radially and axially fixing said nozzle mouthpiece to said flame holder means relative to the longitudinal axis of said nozzle mouthpiece and further means detachably connecting said securing flange means to the combustion chamber outer wall in such a manner that the flange and connecting means will elastically absorb differences in the thermal expansion between the combustion chamber system wall and the nozzle body means.

2. An arrangement according to claim 1, wherein said securing flange means is an expansion body yielding essentially in the axial direction with respect to the flange plane.

3. An arrangement according to claim 2, wherein said securing flange means is provided with a relatively thin-walled expansion collar which passes over by way of a rounded portion with a relatively large radius of curvature into a reinforced flange foot portion of substantially thicker walled construction than said thin-walled expansion collar.

4. An arrangement according to claim 3, wherein said thin walled expansion collar is curved between said nozzle body and the foot portion.

5. An arrangement according to claim 3, wherein said thin walled expansion collar is of half-wave shape between said nozzle body and the foot portion.

6. An arrangement according to claim 1, wherein said securing flange means is provided with a relatively thin-walled expansion collar which passes over by way of a rounded portion with a relatively large radius of curvature into a reinforced flange foot portion, said expansion collar is curved.

7. An arrangement according to claim 1, wherein said securing flange means is provided with a relatively thin-walled expansion collar which passes over by way of a rounded portion with a relatively large radius of curvature into a reinforced flange foot portion, said expansion collar is of half-wave shape.

8. An arrangement for mounting fuel injection nozzles on the combustion chamber system of gas-turbine drive units, comprising nozzle body means having securing flange means, flame holder means, a nozzle mouthpiece inserted into said flame holder means, and further means detachably connecting said securing flange means at the combustion chamber outer wall in such a manner as to elastically absorb differences in the expansion between the combustion chamber system and the nozzle body means, said further means provides a prestress on the part of the securing flange means which, with a cold combustion chamber, is directed oppositely to the thermal stresses occurring during operations.

9. An arrangement according to claim 8, wherein the prestress of the securing flange means amounts to about half the maximum thermal stress.

10. An arrangement according to claim 8, wherein said further means includes spacer disk means inserted between the bottom side of the flange foot and the seat thereof at the combustion chamber outer wall, said spacer disk means having a thickness determining the intended prestress and compensating for manufacturing inaccuracies.

11. An arrangement according to claim 8, wherein said further means is formed in effect by constituting said securing flange means as an expansible body yielding essentially in the axial direction with respect to the flange plane, said securing flange means is provided with a relatively thin-walled expansion collar which passes over by way of a rounded portion with a relatively large radius of curvature into a reinforced flange foot portion.

12. An arrangement according to claim 8, further comprising air guide means, and support protuberance means arranged at the air guide means for supporting the rear end of the part of the nozzle body means extending in the longitudinal axis of the nozzle orifice, said support protuberance means being effective in a direction substantially perpendicular to said longitudinal axis, being disposed substantially in the plane of the nozzle body means and being accommodated at the air guide means, said further means is formed in effect by constituting said securing flange means as an expansion body yielding essentially in the axial direction with respect to the flange plane.

13. An arrangement according to claim 11, wherein the prestress of the securing flange means amounts to about half the maximum thermal stress.

14. An arrangement according to claim 13, wherein said further means includes spacer disk means inserted between the bottom side of the flange foot and the seat thereof at the combustion chamber outer wall, said spacer disk means having a thickness determining the intended prestress and compensating for manufacturing inaccuracies.

15. An arrangement according to claim 14, wherein said securing flange means is constructed as separate structural part and of a material different from and having a higher elastic limit than the material of said nozzle body means and is detachably connected with the head portion of the nozzle body means.

16. An arrangement according to claim 15, wherein said elastic material is spring steel.

17. An arrangement according to claim 16, further comprising air guide means between the nozzle mouthpiece and the flameholder, said air guide means being formed by annularly spacing the mouthpiece and flame holder by spaced protuberances located near the junction of said mouthpiece and nozzle body means.

18. An arrangement according to claim 1, wherein said securing flange means is constructed as a separate structural part and of a material different from and having a higher elastic limit than the material of said nozzle body means and is detachably connected with the head portion of the remainder of said nozzle body means.

19. An arrangement according to claim 18, wherein said elastic material is spring steel.

20. An arrangement according to claim 1, further comprising air guide means between the nozzle mouthpiece and the flame holder, said air guide means being formed by annularly spacing the mouthpiece and flame holder by spaced protuberances located near the junction of said mouthpiece and nozzle body means.

21. An arrangement according to claim 1, wherein said further means includes spacer disk means inserted between the bottom side of the flange foot and the seat thereof at the combustion chamber outer wall, said spacer disk means having a thickness determining the intended prestress and compensating for manufacturing inaccuracies.

22. An arrangement according to claim 1, wherein said further means is formed in effect by constituting said securing flange means as an annular relatively thin-walled body yielding essentially in the axial direction with respect to the flange plane, said nozzle body having a main portion longitudinally extended generally perpendicular to the flange plane and a transverse portion at its said other end extending generally coaxial with said nozzle mouthpiece, said flame holder means having protuberance abutment means engaging and preventing relative movement of said nozzle body means other end while providing for lost motion therebetween in the axial direction of said nozzle mouthpiece, and said means radially and axially fixing said nozzle mouthpiece being spaced a substantial distance from said protuberance abutment means in the axial direction of said nozzle mouthpiece.

References Cited

UNITED STATES PATENTS

| | | |
|---|---|---|
| 2,348,833 | 5/1944 | Miller. |
| 3,026,675 | 3/1962 | Vesper et al. _____ 60—39.74 |
| 3,085,398 | 4/1963 | Ingleson _____ 60—39.32 |
| 3,104,525 | 9/1963 | Shields _____ 60—39.32 |

JULIUS E. WEST, *Primary Examiner.*